(12) United States Patent  
Narsky

(10) Patent No.: US 9,189,750 B1  
(45) Date of Patent: Nov. 17, 2015

(54) METHODS AND SYSTEMS FOR SEQUENTIAL FEATURE SELECTION BASED ON SIGNIFICANCE TESTING

(71) Applicant: Ilya Narsky, Newton, MA (US)

(72) Inventor: Ilya Narsky, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 301 days.

(21) Appl. No.: 13/843,854

(22) Filed: Mar. 15, 2013

(51) Int. Cl.  
  *G06F 15/18* (2006.01)  
  *G06N 99/00* (2010.01)

(52) U.S. Cl.  
  CPC .................... *G06N 99/005* (2013.01)

(58) Field of Classification Search  
  USPC .......................................................... 706/12  
  See application file for complete search history.

(56) References Cited

U.S. PATENT DOCUMENTS

| | | | | |
|---|---|---|---|---|
| 7,580,742 | B2* | 8/2009 | Tan et al. | 600/544 |
| 8,023,974 | B1* | 9/2011 | Diao et al. | 455/466 |
| 8,655,803 | B2* | 2/2014 | Lecerf et al. | 706/12 |
| 2010/0150448 | A1* | 6/2010 | Lecerf et al. | 382/190 |
| 2011/0224913 | A1* | 9/2011 | Cui et al. | 702/19 |
| 2013/0184538 | A1* | 7/2013 | Lee et al. | 600/301 |
| 2014/0228714 | A1* | 8/2014 | Chau et al. | 600/593 |

OTHER PUBLICATIONS

Using simulation to study statistical tests for arrival process and service time models for service systems Song-Hee Kim; Whitt, W. Simulation Conference (WSC), 2013 Winter Year: 2013 pp. 1223-1232, DOI: 10.1109/WSC.2013.6721510.*

Statistical Detection of Boolean Regulatory Relationships Ting Chen; Braga-Neto, U.M. Computational Biology and Bioinformatics, IEEE/ACM Transactions on Year: 2013, vol. 10, Issue: 5 pp. 1-1, DOI: 10.1109/TCBB.2013.118.*

A statistical test for intrinsically multivariate predictive genes Ting Chen; Braga-Neto, U. Genomic Signal Processing and Statistics, (GENSIPS), 2012 IEEE International Workshop on Year: 2012 pp. 151-154, DOI: 10.1109/GENSIPS.2012.6507751.*

Improving blotch detection in old films by a preprocessing step based on outlier statistical test Ammar-Badri, H.; Benazza-Benyahia, A. Signal Processing Conference, 2011 19th European Year: 2011 pp. 539-543.*

* cited by examiner

*Primary Examiner* — Michael B Holmes  
(74) *Attorney, Agent, or Firm* — Finnegan, Henderson, Farabow, Garrett & Dunner, LLP

(57) ABSTRACT

Systems and methods for determining a reduced feature set for a model for classifying data are disclosed. In some embodiments, the method includes obtaining a first feature set for the model. The method may also include selecting a second feature set for the model, wherein the second feature set is a candidate for the reduced feature set. In some embodiments, the second feature set is a subset or a superset of the first feature set. In some embodiments, the selection includes applying a selection statistical test. The method may further include determining whether the model using the second feature set in place of the first feature set is adequate for classifying the data. In some embodiments, the determination includes applying an evaluation statistical test.

28 Claims, 9 Drawing Sheets

METHODS AND SYSTEMS FOR SEQUENTIAL FEATURE SELECTION BASED ON SIGNIFICANCE TESTING

TECHNICAL FIELD

The present disclosure relates generally to modeling and particularly to methods and systems for sequential feature selection based on significance testing using statistical tests.

BACKGROUND

In various areas of machine learning and statistics, mathematical models are constructed, learned, or derived for classifying data into categories, classes, or subsets. For example, machine learning may be used to generate models for categorizing handwritten characters as the corresponding alphanumeric character, recognizing a portion of a photo as a face, or the face of a specific person. In another example, machine learning may be used to generate models that predict tomorrow's temperature based on various current weather elements or predict a patient's prognosis based on the patient's symptoms. In yet another example, the models may classify whether a particular e-mail is a spam e-mail, based on the content of the e-mail.

Models classify data or make predictions that utilize the data based on a number of features associated with the data. The models include algorithms and rules to process the data and generate the classifications or predictions. Models are used in a wide range of applications, including analysis of genetic data, financial modeling, image classification, sorting tasks, weather prediction, and many other applications. By utilizing these models, data can be sorted to aid in extraction of useful information, including trends, from the data.

The accuracy of a model may vary depending on the number of features used by the model to classify the data. In some cases, there may be an optimal or improved set of features used by the model, wherein the improved set of features allows the model to classify the data more efficiently and accurately. In such situations, if the model utilizes a lesser number of features than that in the optimal set, the classification accuracy of the model may be compromised. On the other hand, if a model uses a greater number of features than that in the optimal set, the computational cost of the model may increase without a significant gain in accuracy. For instance, in the example of predicting a prognosis for a patient with a disease, a model may generate the prediction based on a feature set of one feature, such as the age of the patient. The model may be able to generate predictions with minimal computational resource, but the predictions may lack accuracy. In another situation, the model may generate the prediction based on a feature set of several hundred features, including age, weight, genetic profile, previous illnesses, previous treatments, etc. The model may be able to generate predictions with high accuracy, but the predictions may be computationally expensive. An optimal feature set would include enough features to enable the model to generate a classification or prediction with an acceptable level of accuracy, while excluding features that are not necessary for the desired level of accuracy.

There is a need for systems and methods that can determine the optimal feature set for various models.

SUMMARY

In various aspects, the present disclosure is directed to a method for determining, by one or more processors, a reduced feature set for a model for classifying data, according to various backward elimination embodiments. The method may include obtaining a first feature set for the model. The method may also include selecting a second feature set for the model, wherein the second feature set is a subset of the first feature set and is a candidate for the reduced feature set. The selecting may include applying a selection statistical test by the one or more processors. The method may further include determining whether the model using the second feature set in place of the first feature set is adequate for classifying the data.

In other various aspects, the present disclosure is directed to a method for determining, by one or more processors, a reduced feature set for a model for classifying data according to various backward elimination embodiments. The method may include obtaining a first feature set for the model. The method may also include selecting a second feature set for the model, wherein the second feature set is a subset of the first feature set and is a candidate for the reduced feature set. The method may further include determining whether the model using the second feature set in place of the first feature set is adequate for classifying the data. The determining may include applying an evaluation statistical test by the one or more processors.

In yet other various aspects, the present disclosure is directed to a method for determining, by one or more processors, a reduced feature set for a model for classifying data according to various forward addition embodiments. The method may include obtaining a first feature set for the model. The method may also include selecting a second feature set for the model, wherein the second feature set is a superset of the first feature set and is a candidate for the reduced feature set. The selecting may include applying a selection statistical test by the one or more processors. The method may further include determining whether the model using the second feature set in place of the first feature set is adequate for classifying the data.

In other various aspects, the present disclosure is directed to a method for determining, by one or more processors, a reduced feature set for a model for classifying data according to various forward addition embodiments. The method may include obtaining a first feature set for the model. The method may also include selecting a second feature set for the model, wherein the second feature set is a superset of the first feature set and is a candidate for the reduced feature set. The method may further include determining whether the model using the second feature set in place of the first feature set is adequate for classifying the data. The determining may include applying an evaluation statistical test by the one or more processors.

Other various aspects of the present disclosure are directed to a system for determining a reduced feature set for a model for classifying data according to various embodiments. The system may include a storage device configured to store a first feature set. The system may also include a selector module configured to select a second feature set for the model. In some embodiments, the second feature set may be a subset of the first feature set and a candidate for the reduced feature set. In some other embodiments, the second feature set may be a superset of the first feature set and a candidate for the reduced feature set. The system may include an evaluator module configured to determine whether the model using the second feature set in place of the first feature set is adequate for classifying the data. In various embodiments, selecting the second feature set may include applying a selection statistical test by one or more processors. In various other embodiments, determining whether the model using the second feature set is adequate for classifying the data may include applying an evaluation statistical test by the one or more processors.

Further various aspects of the present disclosure are directed to a computer-readable medium for storing a program. The program may be executed by one or more processors, causing the one or more processors to determine a reduced feature set for a model for classifying the data. The program may include one or more instructions that, when executed by the one or more processors, cause the one or more processor to obtain a first feature set for the model. The processor may also select a second feature set for the model. In some embodiments, the second feature set may be a subset of the first feature set. In some other embodiments, the second feature set may be a super set of the first feature set. In some embodiments, the processor may select the second feature set by applying a selection statistical test. The processor may further determine whether the model using the second feature set in place of the first feature set is adequate for classifying the data. In some embodiments, the processor may determine whether the second feature set is adequate by applying an evaluation statistical test by the one or more processors.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Figure 1:
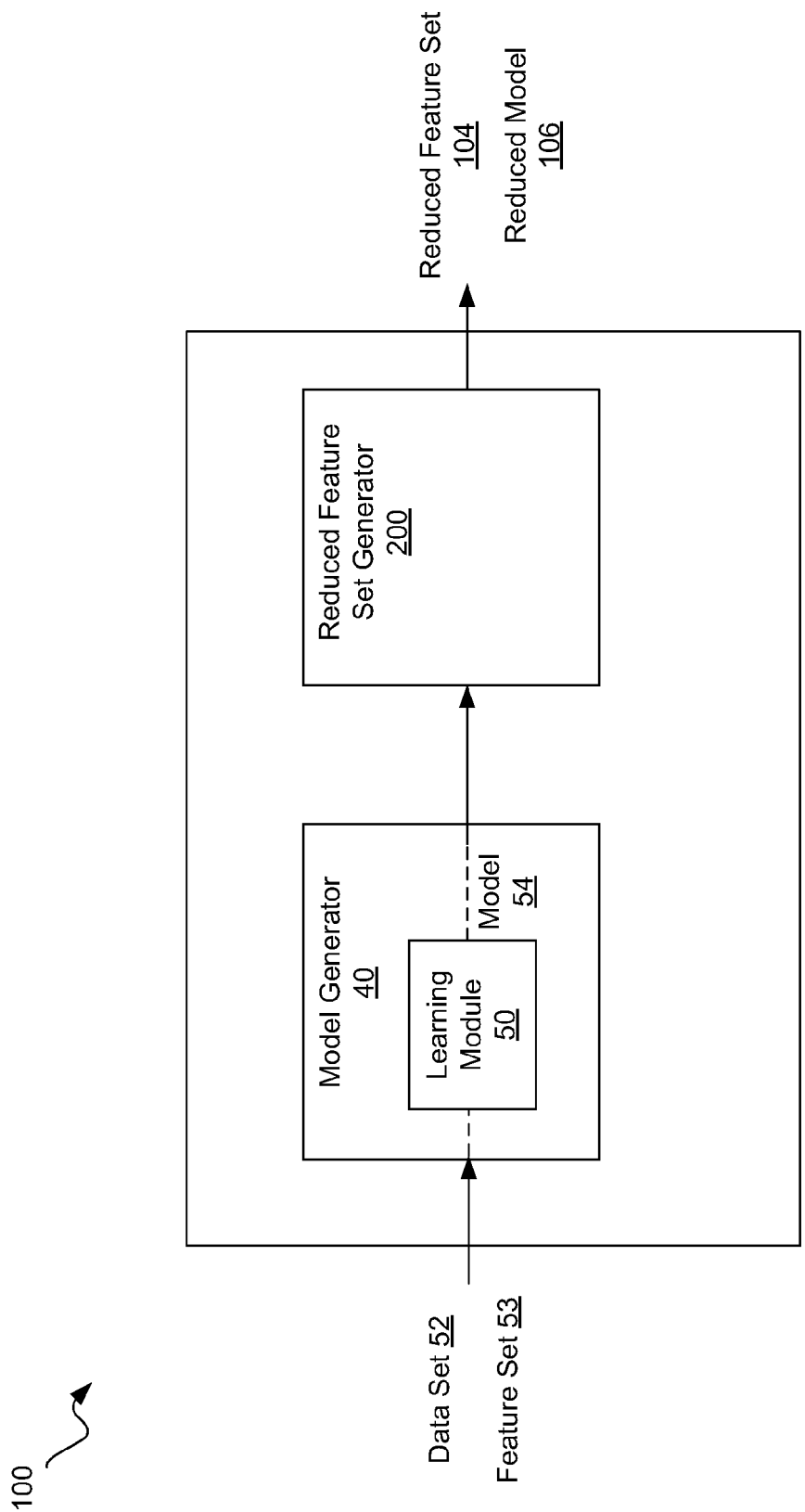
FIG. 1 is an exemplary block diagram of a system for performing sequential feature selection according to various embodiments.

The following detailed description refers to the accompanying drawings. Wherever possible, the same reference numbers are used in the drawings and the description to refer to the same or similar parts. Also, similarly-named elements may perform similar functions and may be similarly designed, unless specified otherwise. Numerous details are set forth to provide an understanding of the described embodiments. The embodiments may be practiced without these details. In other instances, well-known methods, procedures, and components have not been described in detail to avoid obscuring the described embodiments. While several exemplary embodiments and features are described here, modifications, adaptations, and other implementations may be possible, without departing from the spirit and scope of the invention. Accordingly, unless stated otherwise, the descriptions relate to one or more embodiments and should not be construed to limit the invention as a whole. Instead, the proper scope of the invention is defined by the appended claims.

In various embodiments, supervised machine learning may involve systems and methods for obtaining models that generate a classification or a prediction based on input data. A model may be obtained by running a learning algorithm on a training data set, which may be representative of the data that the model later classifies. Based on the training data set, the learning algorithm may generate a model, for example, in the form of a function. A classification model may output discrete values for given input data. Alternatively, a regression model may output continuous values, or ordered discrete values, for given input data.

As an example, a classification model may be used to classify a set of coins, more specifically to determine whether a coin is or is not a penny. Such a model may classify the coins based on the weight, color and volume of the coins. Each coin has a specific weight, color, and volume, and based on the values of these features, the classification model may determine or estimate two outcomes: the coin is a penny or the coin is not a penny.

In another example, a regression model may generate a prediction of future temperatures for locations based on current pressures, humidities, and temperatures. Based on the current pressure, humidity, and temperature of each location, such a regression model may predict for a future temperature from a continuous range of possible future temperatures. In various embodiments, the disclosed systems and methods are applicable to both classification models and regression models.

In various embodiments, the training data may comprise a set of paired inputs, such as $\{X_1, y_1\} \ldots \{X_n, y_n\}$. $X_i$ may represent a data point and $y_i$ may represent a label. Each data point X may correspond to an observation, object, sample, event, or any other such aspect that can be represented by data. Each data point may comprise a set of values corresponding to one or more features. For example, coin 1 (a data point) may be represented by a weight $w_1$, a color $c_1$, and a volume $v_1$. Therefore, $X_1$ may correspond to $\{w_1, c_1, v_1\}$. Another coin 2 may be represented as $X_2$, which corresponds to $\{w_2, c_2, v_2\}$. For purposes of this disclosure, these one or more features are collectively referred to as a feature set. A feature may comprise one or more qualities, characteristics, or any other attributes related to a data point. In some embodiments, each data point may be represented as a vector, wherein each element of the vector corresponds to one of the features.

In various embodiments, the label y may represent a classification, category, prediction, or attribute of interest associated with the data point X. For example, referring to the above-mentioned example of classifying coins, the value of y may indicate whether a coin is a penny or not a penny. In some embodiments, y may have a value of zero, corresponding to when the coin is not a penny, and a value of one, corresponding to when the coin is a penny. In the other example of weather prediction, the value of y may indicate a future temperature of a location.

A model that is trained based on the training data set may then be applied to other data sets that comprise known data points X with the same feature set, for which the labels y are not known. The model may receive the data points X and output an estimate of the corresponding labels y. For instance, with reference to the above example of coins, a learning algorithm may generate a model for classifying coins based on a training data set. The training data set may represent a set of coins comprising data point X and a label y corresponding to each coin of the set. Data point X may include information related to each of three features of a coin: weight, color, and volume. Based on the data points X and known labels y of the training data set, the learning model may generate the model for classifying coins. This generated model may then receive another data set corresponding to a new set of coins. In various embodiments, the new data set includes, for each coin, information related to the same feature set included in the training data set, that is, weight, color, and volume. However, the new data set may not include corresponding labels y. That is, there is no prior knowledge of whether each coin in the new set is or is not a penny. The model may estimate whether each coin in the new set is or is not a penny based on the results of the training data set. The model may output an estimated label ŷ for each coin, indicating whether the model has estimated the coin to be a penny or not a penny. ŷ represents an estimate or prediction of label y.

Similarly, in the above example of a model that predicts temperatures, the feature set comprises current pressure, humidity, and temperature of a location. The label comprises the future temperature of the location. The training data set may comprise known pressures, humidity, and temperatures of multiple locations together with subsequent future temperatures at each of these locations. Based on the training data set, the learning algorithm may generate a model for predicting a future temperature of (i.e., generating a label for) any location based on the location's current pressure, humidity, and temperature (i.e., data corresponding to the feature set).

In various embodiments, an optimum or improved feature set for a model may exist. In the above coin classification example, although the data may include the weight, color, and volume, a model may not need all of the data to accurately classify the coins. For example, in a situation where all of the coins are made of the same material, using both weight and volume may be redundant. That is, because the weight of the coin is directly proportional to the volume of the coin, the model does not gain additional information by knowing the volume if it knows the weight or vice versa. The model may therefore be optimized or improved by reducing the feature set to only include weight and color, or to only include volume and color. Alternatively, in the same example, there may be no correlation between the color of the coin and whether the coin is a penny. For example, it may be that all of the coins have been randomly painted various colors. In such a case, the model may not be able to use the information about the color of the coin to classify it. Therefore, the model may be improved by reducing the feature set from including volume, weight, and color, to only including volume and weight.

It is noted that various disclosed embodiments are applicable to discrete classification models and continuous (or ordered discrete) regression models. In the interest of clarity, the following embodiments will refer to classification only. However, it is to be understood that the following embodiments are not limited to classifications and may also be applied to regression models.

FIG. 1 illustrates an exemplary system 100 for determining a reduced feature set for a model according to some embodiments. System 100 comprises a model generator 40 and a reduced feature set generator 200. Model generator 40 comprises a learning module 50. Model generator 40 may receive an initial input comprising data 52 having a corresponding feature set 53. For example, data 52 may be a training data set. Data 52 may also be other data sets, such as a validation data set, a test data set, or a reduced data set, as detailed below.

Model generator 40 generates a model 54 by applying the learning module 50 to the input data 52. For example, input data 52 includes a set of inputs paired with outputs, which are provided to learning module 50. Based on the set of paired inputs and outputs, learning module 50 infers a model (e.g., a function) that maps the inputs to the outputs. In some embodiments, model 54 may be a full model, and the corresponding feature set 53 may be a full feature set. When the full model is applied to a data set comprising input values, the full model generates output values utilizing the learned function that maps the inputs to the outputs. The full model and the full feature set may be a model 54 and feature set 53 for which a reduced model and reduced feature set is desired. Reduced feature set generator 200 may receive the full model generated by model generator 40 and the corresponding full feature set which generated the full model. In various embodiments, receiving the feature set may refer to receiving a data set that corresponds to the feature set.

Reduced feature set generator 200 may use data 52 and feature set 53 to generate a reduced feature set 104 and a corresponding reduced model 106, as discussed below in more detail. In various embodiments, reduced feature set 104 may comprise a smaller number of features than the full feature set. As a result, in some embodiments, reduced model 106 may perform more efficiently than the full model.

Figure 2:
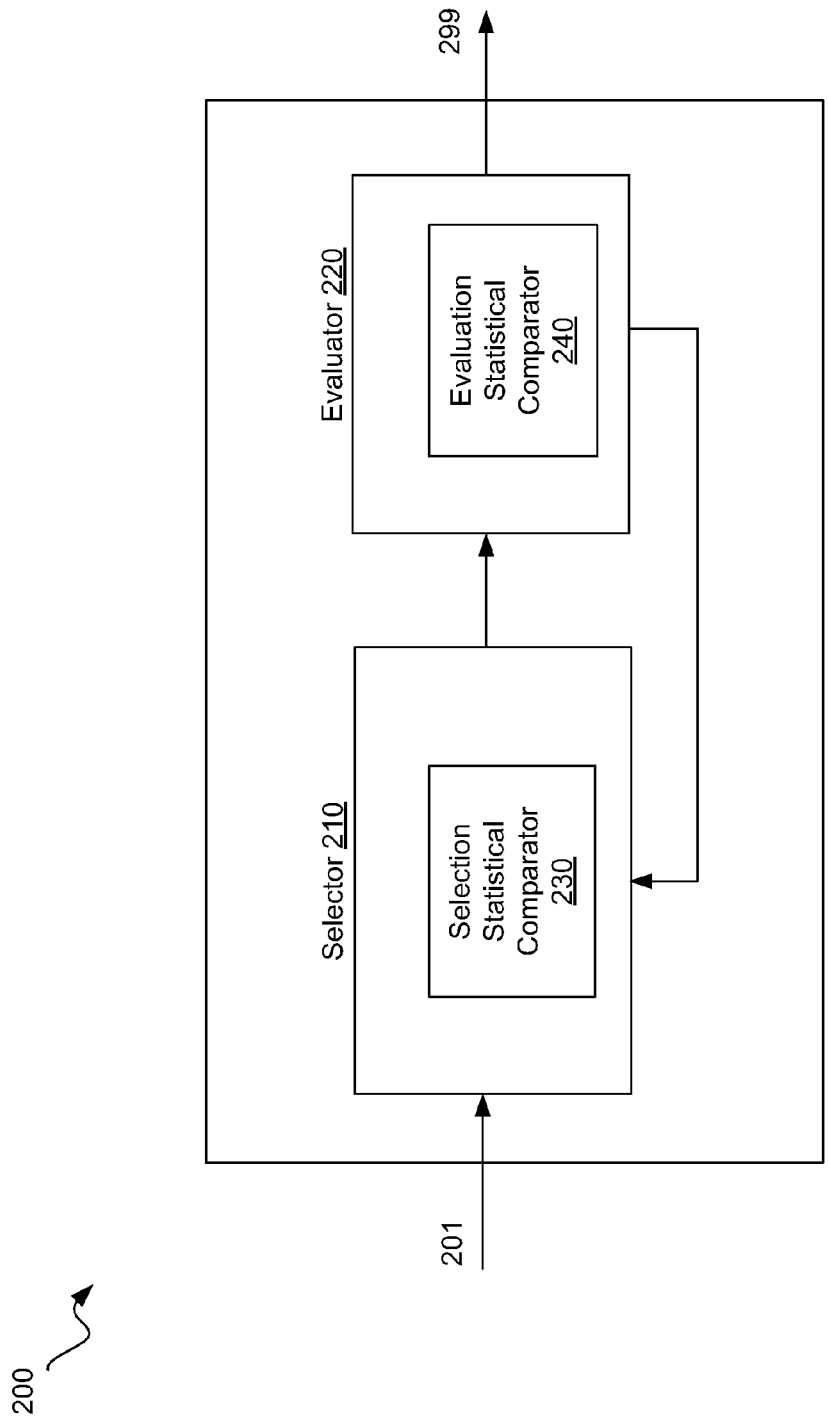
FIG. 2 is another exemplary block diagram of a system for performing sequential feature selection according to various embodiments.

FIG. 2 illustrates an exemplary reduced feature set generator 200 according to some embodiments. System 200 comprises a selector module 210 and an evaluator module 220. Selector 210 comprises a selection statistical comparator 230. Evaluator 220 comprises an evaluation statistical comparator 240.

In various embodiments, system 200 may generate a reduced feature set that may be used to replace the full feature set. In some embodiments, system 200 may obtain the reduced feature set by a technique hereinafter called backward elimination. Backward elimination may include starting with a full feature set and removing one or more least important or less important features from the full feature set. System 200 may determine which features to remove based on results from a selection statistical test. Further, system 200 may apply an evaluation statistical test to determine whether the feature set with removed features retains a level of classification accuracy that is within a predetermined acceptable range. If so, system 200 may set the feature set with fewer features as the reduced feature set.

In alternative exemplary embodiments, system 200 may obtain the reduced feature set by a technique hereinafter called forward addition. Forward addition may include starting with a null feature set or a subset of a full feature set, and adding one or more most important or more important features to the null feature set. The added features may be selected from the full feature set. System 200 may determine which features to add based on results from a selection statistical test. Further, system 200 may apply an evaluation statistical test to determine whether the feature set with added features attains a level of classification accuracy within a predetermined acceptable range. If so, system 200 may set the feature set with the added features as the reduced feature set. Embodiments of backward elimination and forward addition are discussed in greater detail below.

In various backward elimination embodiments, system 200 may receive an input 201 that comprises the full feature set and the full model generated by model generator 40. System 200 may set a first feature set to be the full feature set. Selector 210 may perform a selection process, which may include selecting and removing one or more features of the first feature set to generate a potential second feature set. Selector 210 may generate more than one potential second feature sets. Selector 210 may then use selection statistical comparator 230 to determine which one of the potential second feature sets to use as a second feature set.

Alternatively, in various forward addition embodiments, system 200 may receive an input 201 that comprises the full feature set and the full model generated by model generator 40. System 200 may set a first features set to be a null feature set. Selector 210 may perform a selection process, which may include selecting one or more features from the full feature set and adding those selected features to the first feature set to generate a potential second feature set. Selector 210 may generate more than one potential second feature sets. Selector 210 may then utilize selection statistical comparator 230 to determine which one of the potential second feature sets to set as a second feature set.

Selection statistical comparator 230 may apply a selection statistical test to compare the potential second feature sets. In some embodiments, an exemplary selection statistical test comprises a signed rank test. For example, with a right-tailed signed rank test, a null hypothesis postulates that the median of the differences between pairs of observations does not exceed zero. Selection statistical comparator 230 may use the right-tailed signed rank test to compare distributions of classification margins associated with the full feature set and a potential second feature set. In various embodiments, classification margin is the difference between a classification score for the true class and a maximal classification score for the false class. Classification scores may be provided as part of the learned model. In various embodiments, classification scores correspond to confidence levels of the classification.

More specifically, in some embodiments, classification scores may correspond to the posterior probability of the classification. For example, a model may output a classification (i.e. an estimated label $\hat{y}$) from two possible classifications for a particular data point in a data set. The posterior probability of the first classification may be 0.8 and the posterior probability of the second classification may be 0.2. Based on the posterior probabilities, the model may classify the particular data point as being in the first class. If the data point is in fact in the first class, its corresponding classification margin may be 0.8 (classification score associated with the true class) minus 0.2 (classification score associated with the false class), which is 0.6. If the data point is in fact in the second class, its corresponding classification margin may be 0.2 (classification score associated with the true class) minus 0.8 (classification score associated with the false class), which −0.6. A larger classification margin may indicate a more accurate classification.

In various embodiments, selection statistical test comparator 230 generates a classification margin for each data point based on the estimated classification generated by a model, such as the model using a full feature set or a model using a potential second feature set. Each set of classification margins may be represented as a vector. In some other embodiments involving regression models, the signed rank test may be used to compare distributions of magnitudes of residuals associated with models that use the potential second feature sets. In various embodiments, a residual is the difference between the actual value of label y and the predicted value of label y generated by a model.

In the example of using the right-tailed signed rank test to compare classification margins for a full feature set and a potential second feature set, the null hypothesis may be that the median of the differences between the classification margins of the full feature set and the classification margins of the potential second feature set does not exceed zero. Such a null hypothesis may postulate that the potential second feature set is not less accurate than the full feature set. The right-tailed signed rank test may provide a p-value as a result. A large p-value, such as 0.95, may indicate a high probability that the null hypothesis is true, i.e., the potential second feature set is not less accurate than the full feature set. A small p-value, such as 0.05, may indicate a low probability that the second potential feature set is not less accurate than the full feature set. Accordingly, a small p-value may correspond to a high probability that an alternative hypothesis is true, i.e., the full feature set is more accurate than the potential second feature set.

Selector 210 may use the results of the right-tailed signed rank test to select a second feature set from among the potential second feature sets. The process of selection using a selection statistical test is described in further detail below. In various embodiments, selection statistical comparator 230 may apply other selection statistical tests, such as a rank sum test, e.g. Wilcoxon rank sum test, or a sign test. For example, for classification, the sign test compares the number of lowered (or alternatively, raised) classification margins or absolute values of residuals due to the removal of a feature from the feature set. The process of selection using a selection statistical test is described in further detail below.

Evaluator 220 may receive the second feature set and determine whether the second feature set is adequate for classifying the data. Evaluator 220 may use evaluation statistical comparator 240 to compare levels of classification error that result from the second feature set and from the full feature set. In some embodiments, an exemplary selection statistical test may comprise a binomial test, a 5×2 cross-validation paired t test, or a 10-fold cross-validation test with calibrated degrees of freedom for classification models; mean square error comparison test for regression models; or any other significant testing types of statistical tests. In the example of a binomial test, the null hypothesis may postulate that the number of times the full model correctly classifies the data does not exceed the number of times the second model correct classifies the data. An exemplary implementation may include defining N01 to be the number of observations misclassified by the full model and correctly classified by the reduced model. N10 may be defined to be a number of observations correctly classified by the full model and misclassified by the reduced model. The null hypothesis of the binomial test may be that N10 does not exceed N01. The mean square error comparison test may test a null hypothesis that postulates the mean square error for the reduced model does not exceed the mean square error for the full model. The process of evaluation is described in further detail below.

In various backward elimination embodiments, if evaluator 220 determines that the second feature set is adequate for classifying the data, selector 210 may receive the second feature set as a new first feature set for further removal of features. System 200 may continue to iterate the selection and evaluation of second feature sets. Each second feature set may have fewer features than the previous second feature set. If, in an iteration, evaluator 220 determines that a second feature set is inadequate for classifying the data, system 200 may stop the iterations. System 200 may output the second feature set from the previous iteration as a reduced feature set 299 of the full feature set. The process of backward elimination is discussed in further detail below.

In various forward addition embodiments, if evaluator 220 determines that the second feature set is inadequate for classifying the data, selector 210 may receive the second feature set as a new first feature set for further addition of features. System 200 may continue to iterate the selection and evaluation of second feature sets. Each second feature set may have more features than the previous second feature set. If, in an iteration, evaluator 220 determines that a second feature set is adequate for classifying the data, system 200 may stop the iterations. System 200 may output the second feature set from the last iteration as a reduced feature set 299. The process of forward addition is discussed in further detail below.

Figure 3:
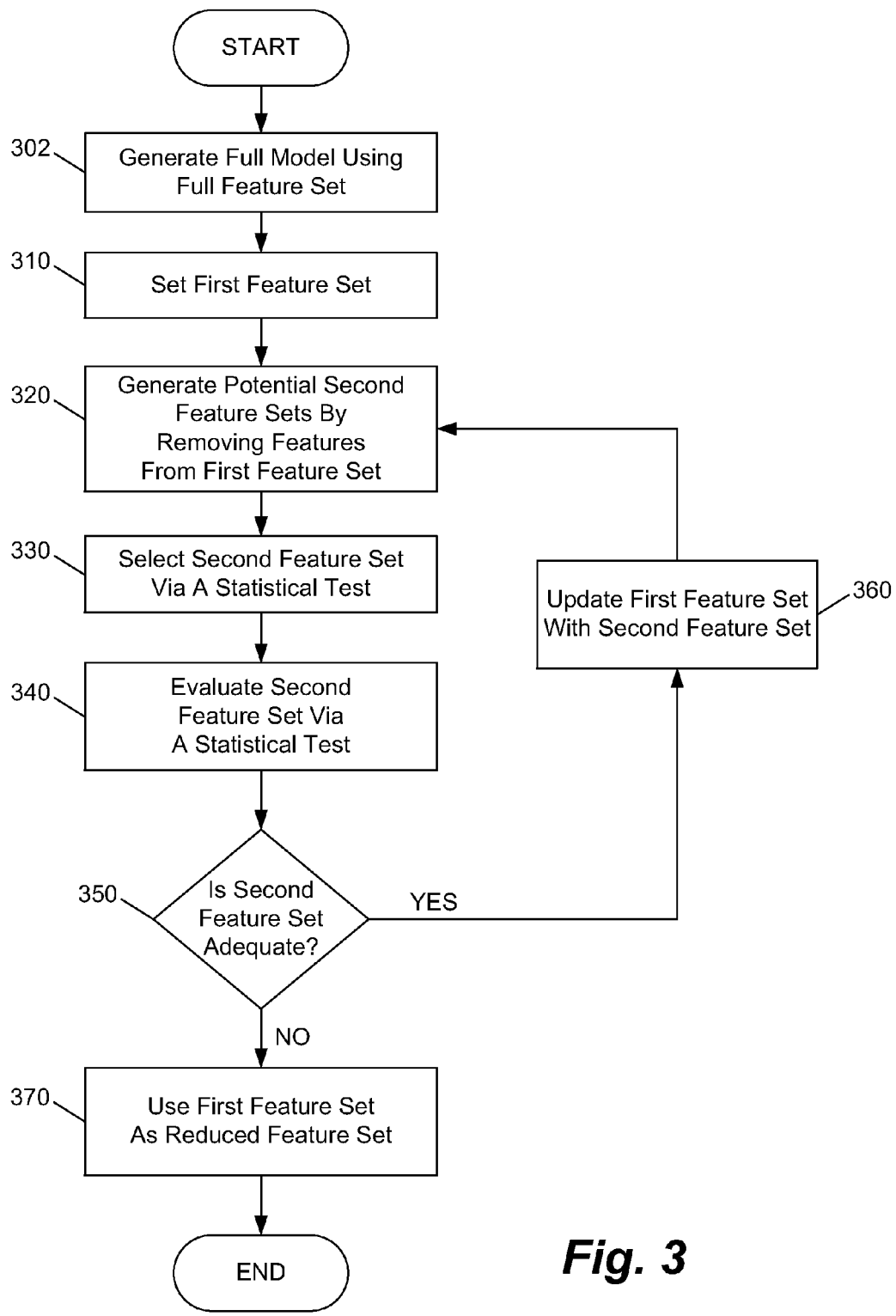
FIG. 3 is a flowchart of an exemplary method for performing backward sequential feature selection according to various embodiments.

FIG. 3 is a flowchart of an exemplary method of determining a reduced feature set according to various backward elimination embodiments. In various exemplary embodiments, the method may be performed by a system for determining a reduced feature set, such as system 100. In various embodiments, the system applies the method to data sets with a varying number of features, such as a dozen, several hundred, or more than several hundred features.

At Step 302, the system may generate a full model using a full feature set. In various embodiments, the system may use a model generator, such as model generator 40, to generate a model. The system may receive a training data set having the full feature set. The system may run a learning algorithm on the training data set to generate the full model. The training data set may comprise a set of n inputs of the form $\{X_1, y_1\} \ldots \{X_n, y_n\}$. For purposes of this disclosure, S denotes a feature set comprising features $\{s_1, s_2, \ldots s_m\}$. Each data point X may include m elements, each element corresponding to a feature s in the feature set S.

At Step 310, the system may set the full feature set as a first feature set. At Step 320, the system may generate a plurality of potential second feature sets. In various embodiments, the system generates a potential second feature set by reducing the first feature set. For example, the system may generate a number of potential second feature sets by removing different features from the first feature set. If the first feature set comprises the set of features $\{s_1, s_2, s_3, s_4, s_5\}$, for example, the system may generate five potential second feature sets, comprising: $\{s_1, s_2, s_3, s_4\}$, $\{s_1, s_2, s_3, s_5\}$, $\{s_1, s_2, s_4, s_5\}$, $\{s_1, s_3, s_4, s_5\}$, and $\{s_2, s_3, s_4, s_5\}$. In another example, the system may generate potential second feature set by removing from the first feature set more than one feature at a time.

At Step 330, the system may select a second feature set from the plurality of potential second feature sets. The system may use a selection statistical test to make the selection. In various embodiments, the system may use a comparator module, such as selection statistical comparator 230, to perform the selection statistical test. The system may use the selection statistical test to compare one of the potential second feature sets with the first feature set and obtain a comparison value indicative of the comparison. The system may further compare other potential second feature sets with the first feature set to obtain corresponding comparison values. The system may then compare the comparison values for the potential second feature sets to determine which potential second feature set to use as the second feature set. Step 330 is discussed in greater detail with reference to FIG. 4.

Figure 4:
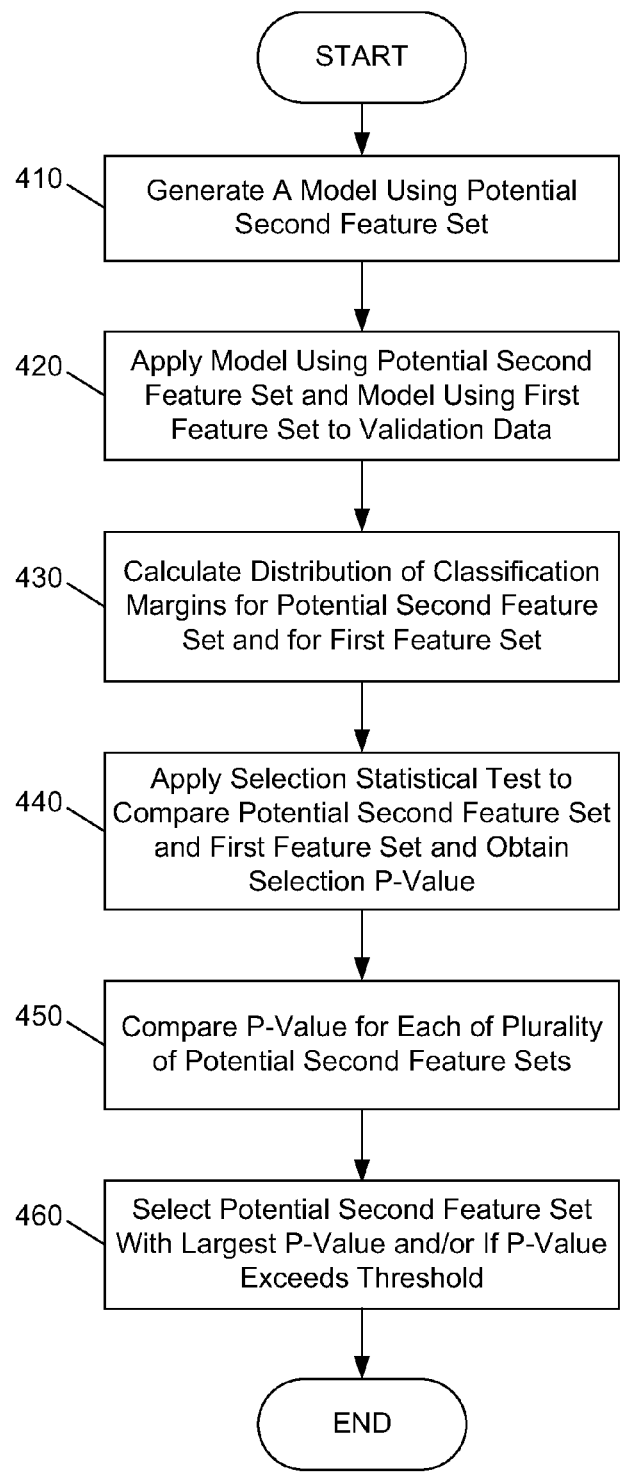
FIG. 4 is a flowchart of an exemplary method for selecting a feature set according to various embodiments.

FIG. 4 illustrates an exemplary method for selecting a second features set according to some embodiments. At Step 410 of FIG. 4, the system generates a model using one of the potential second feature sets. The system may generate the model by altering the training data set to only include features that correspond with the potential second feature set. The system may provide the training data set corresponding to the potential second feature set to the model generator. The model generator may then generate the potential second model that uses the potential second feature set. For example, the training data set may comprise $\{X_1, y_1\} \ldots \{X_n, y_n\}$. Each X may represent data points with full feature set $\{s_1, s_2, s_3, s_4, s_5\}$. The training data set may be modified such that $X_1 \ldots X_n$ include only the features in potential second feature set $\{s_1, s_2, s_3, s_4\}$. Using this modified training data set, the system may generate the potential second model.

At Step 420, the system applies to a validation data set a first model using the first feature set (which at the beginning corresponds to the full feature set) and the potential second model. The validation data set may comprise a set of paired inputs $\{X_1, y_1\} \ldots \{X_p, y_p\}$, in the same manner as the training data set. In various embodiments, the validation data set is different from training data set, to allow for unbiased assessment of how well the model processes new data. In some embodiments, the system may generate from the training data set a validation data set that is effectively different from the training data set. For example, the system may use a re-sampling procedure, such as cross-validation or bootstrap, on the training data set to generate the validation data set.

For cross-validation, a data set may be split into K disjoint subsets that have no element in common. In an exemplary embodiment, training data set may contain (1−1/K) fraction of the data set. The 1/K fraction that is not included in the training data set may be used as another data set, e.g., the validation data set. This method may be repeated K times such that every data point in the data set is used K times for training and once for validating. Averaging the prediction results of the K-fold iteration may produce a single estimate of the classification error or the mean square error. For bootstrap resampling procedures, many replicas of the data set may be generated. Each replica is generated by sampling N observations out of N with replacement. A model may then be trained on observations included in the replica. The model may then be applied to observations not included in this replica, referred to as "out of bag" observations, to generate predictions. Predictions from the model may be averaged over all replicas for a single estimate of the classification error or mean square error.

The system applies each model to the validation data set to derive corresponding estimates. When the system applies the first model to the validation data set, the first model may receive data points $X_1 \ldots X_P$ and generate estimates $\hat{y}_1 \ldots \hat{y}_P$. Similarly, when the system applies the potential second model to the validation data set, the potential second model may receive the same data points $X_1 \ldots X_P$ and generate another set of estimates $\hat{y}_1 \ldots \hat{y}_P$.

At Step 430, the system determines classification margins of the estimated labels generated by the first model. The system may similarly determine the classification margins of the estimated labels generated by the potential second model. The classification margins for each feature set may be represented in the form of a vector of dimension P, the number of data points in the validation data set. Each element in the vector may correspond to a classification margin for a data point based on the estimated classification $\hat{y}$ and the classification scores provided by the models, as described above.

At Step 440, the system compares the two classification margin distributions by using the selection statistical test, for example the right-tailed signed rank test. The result of the selection statistical test may be a selection p-value. The selection p-value may be an indication of the importance of the one or more features that are present in the first feature set but not in the potential second feature set. For example, if the system is using a signed rank test as the selection statistical test, a large selection p-value (the largest possible value being one) may indicate that the classification margin distributions are similar. Such instances may indicate that a model using the potential second feature is as accurate or almost as accurate as a model using the first feature set. Accordingly, the features that have been removed to generate the potential second feature set may not be important. A small selection p-value (the smallest possible value being zero) may indicate that the classification margin distributions are dissimilar. In such instances, the model using the potential second feature set may perform significantly worse than the model using the first feature set.

The system may determine a selection p-value for the other potential second feature sets, e.g., $\{s_1, s_2, s_3, s_5\}$, $\{s_1, s_2, s_4, s_5\}$, $\{s_1, s_3, s_4, s_5\}$, and $\{s_2, s_3, s_4, s_5\}$, by iterating Steps 410 to 440. In some embodiments, the system may calculate the selection p-value of the potential second feature sets in parallel.

At Step 450, the system compares the selection p-values obtained for the plurality of potential second feature sets. At Step 460, the system selects the potential second feature set with the largest selection p-value as the selected second feature set. The largest selection p-value may indicate that the potential second feature set has had the least important feature(s) removed. In some other embodiments, the system may select the potential second feature set with a selection p-value that exceeds a threshold. In various embodiments, the threshold may be a predetermined threshold. In some embodiments, the system may select a potential second feature set as the second feature set if its corresponding selection p-value exceeds the predetermined threshold without determining the selection p-value for the remaining potential second feature sets. In other embodiments, the system may select the potential second feature set with a selection p-value that exceeds a threshold that is determined based on the selection p-values of the other potential second feature sets. For example, the threshold may correspond to the largest p-value corresponding to other potential second feature sets. In such a case, the system selects the potential second feature set with the largest selection p-value, as discussed above.

Returning to FIG. 3, the system evaluates the selected second feature set at Step 340. The system may evaluate whether the selected second feature is adequate as compared with the full feature set. In various embodiments, the system may use a comparator module, such as evaluation statistical comparator 240, to perform the evaluation statistical test. Step 340 is discussed in greater detail with reference to flowchart 500 in FIG. 5.

Figure 5:
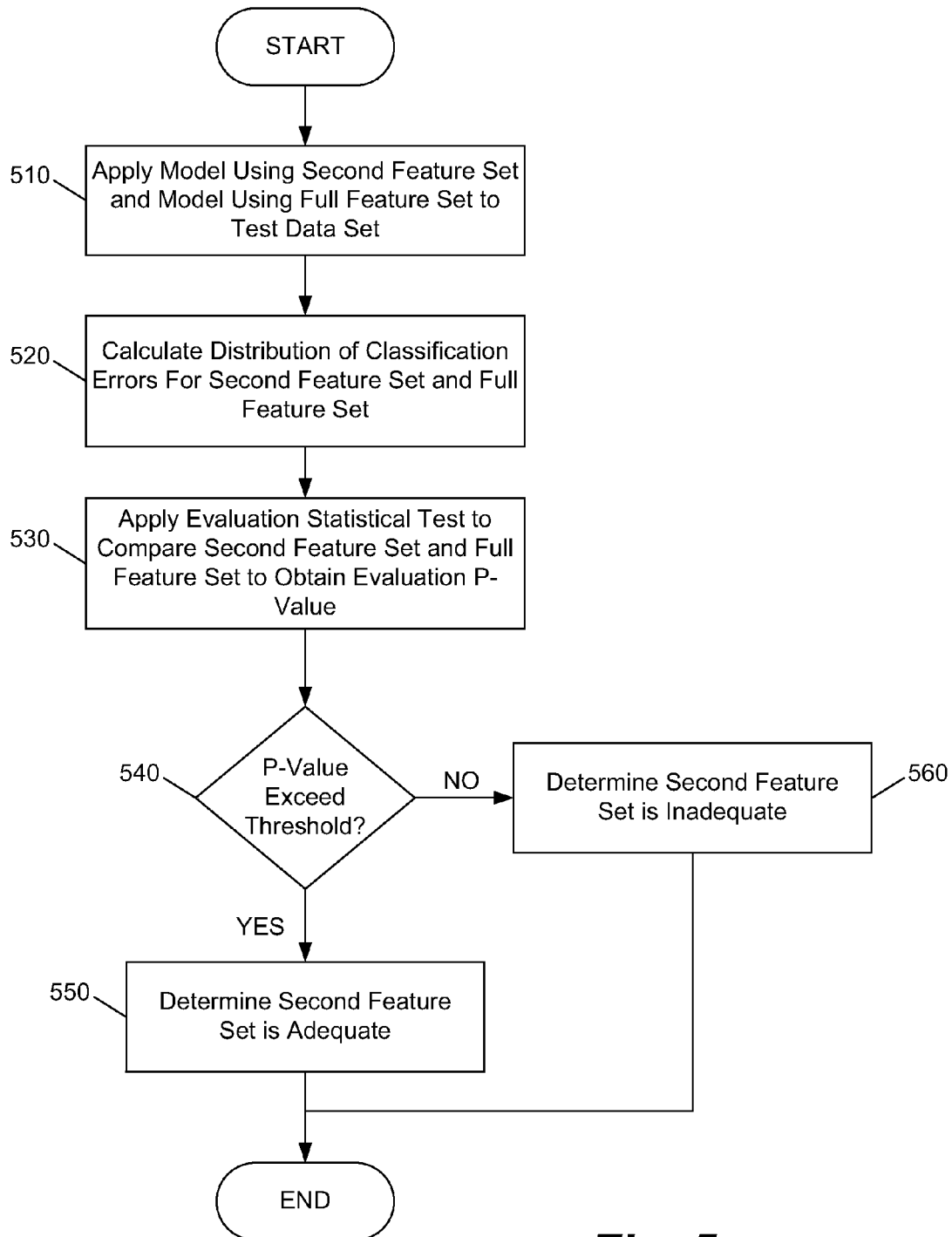
FIG. 5 is a flowchart of an exemplary method for evaluating a feature set according to various embodiments.

FIG. 5 is a flowchart 500 illustrating an exemplary method for evaluating a second features set according to some embodiments. At Step 510, the system applies to a test data set the full model using the full feature set and the second model using the second feature set. In various other embodiments, the system may apply a different model in place of the full model, such as a model using a subset of the full feature set. The subset of full feature set may be generated by randomly selecting one or more features from the full feature set. The test data set may comprise a set of paired inputs $\{X_1, y_1\} \ldots \{X_q, y_q\}$, that are similar to the training data set and validation data set. In various embodiments, the test data set is different from the training data set and validation data set. By using such a different test data set, the system may avoid a biased assessment of how well the model processes new data sets. In some embodiments, the system may generate a test data set by using a re-sampling procedure, as described above, of the training data set or the validation data set.

When the system applies the full model and the second model to the test data set, the models may each generate estimates $\hat{y}_1 \ldots \hat{y}_q$ of labels $y_1 \ldots y_q$. At Step 520, the system calculates classification errors for the full feature set and for the second feature set. For example, the system may determine classification error for the full feature set by calculating the fraction of incorrect estimates $\hat{y}_1 \ldots \hat{y}_q$ for the full feature set. The system may similarly determine the classification error for the second feature set.

At Step 530, the system compares the classification error of the full feature set and the second feature set by using the evaluation statistical test, such as binomial test. The result of the evaluation statistical test may be an evaluation p-value. The evaluation p-value may be a measure of how well the second model estimates the labels y of the test data as compared to the full model. For example, if the system is using a binomial test as the evaluation selection test, a large evaluation p-value may indicate that the classification errors are similar. That is, the closer the evaluation p-value is to one, the higher the probability is that the second model performs as accurately as the full model. The closer the evaluation p-value is to zero, on the other hand, the higher the probability that the second model does not perform as well as the full model.

In various embodiments, the system may determine whether the second feature set is adequate based on the evaluation p-value. In some embodiments, at Step 540, the system determines that the second feature set is adequate when the evaluation p-value exceeds a predetermined threshold. Such a case may indicate that, within an acceptable range of difference, the second model that uses the second feature set performs as well as the full model that uses the full feature set. In some embodiments, the threshold may be 0.05. In some other embodiments, the threshold may be less than or more than 0.05.

Figure 8:
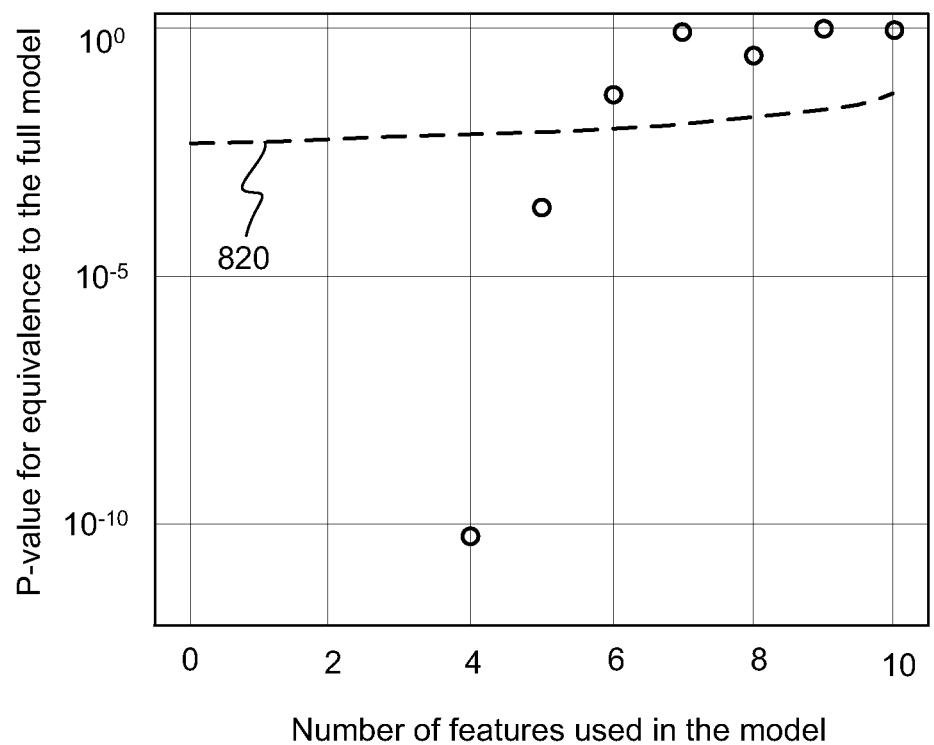
FIG. 8 is an exemplary graph illustrating aspects of the disclosure according to various embodiments.

In some embodiments, the threshold may change. In various embodiments, the threshold changes based on the number of times that the method of FIG. 3 is performed using the same training data set, validation data set, and test data set. In such embodiments, a correction for multiple testing may be applied to the threshold. The Hochberg correction or the Holm correction procedures are two examples of multiple testing correction that may be used. FIG. 8 illustrates a graph showing exemplary results of using the method of FIG. 3 using Hochberg correction of the threshold. Dashed line 820 in FIG. 8 indicates the corrected threshold. With each iteration of the method of FIG. 3, the number of features in the second feature set reduces. If Hochberg correction is used, with each iteration, the Hochberg correction may result in a lower threshold than the one used for the previous iteration.

If the system determines that the p-value exceeds the threshold (Step 540: Yes), in step 550, the system determines that the second feature set is adequate. If, on the other hand, the system determines that the p-value does not exceed the threshold (Step 540: No), in step 560, the system determines that the second feature set is inadequate.

Returning to FIG. 3, if the system determines that the second feature set is adequate (Step 350: YES), the system may attempt to further reduce the second feature set. To that end, at Step 360, the system updates the first feature set with the second feature set. The system may iterate Steps 320 to 350 with the first feature set updated as the second feature set. In such a manner, the second feature set may be further reduced. For example, the second feature set may comprise $\{s_1, s_2, s_3, s_5\}$. The system may set $\{s_1, s_2, s_3, s_5\}$ as the first feature set of the next iteration. At Step 320 of the next iteration, the system may generate four potential second feature sets comprising: $\{s_1, s_2, s_3\}$, $\{s_1, s_2, s_5\}$, $\{s_1, s_3, s_5\}$, and $\{s_2, s_3, s_5\}$. At Step 330, the system may select one of the potential second feature sets as a second feature set of the current iteration. At Step 340, the system may evaluate the second feature set and, at Step 350, determine whether the second feature set is adequate.

If, on the other hand, the system determines that the second feature set is inadequate (Step 350: NO), the system sets the first feature set of the current iteration as the reduced feature set at Step 370. In various embodiments, the reduced feature set may have less features than the full feature set, while a model using the reduced feature set performs within an acceptable range of accuracy as compared with a model that uses the full feature set.

Below is exemplary code illustrating one implementation of the method of FIG. 3 in pseudocode. In this code, CV represents cross-validation of a data set and OOB represents generating a data set by the out-of-bag method. CV and OOB are two methods of resampling a data set to generate a new data set. $S_i$ represents the i-th feature in set S, and m(f, X, y) returns a vector of classification margins for model f applied to data X with class labels y.

Input: Learnable model F
Input: Training data $\{X_{train}, y_{train}\}$ in space (X, Y) with dimensionality D=|X|
Input: Test data $\{X_{test}, y_{test}\}$ in the same space as $\{X_{train}, y_{train}\}$
Input: Test level for comparing with the full model α

1. Learn $f_X = F(X_{train}, y_{train})$
2. Compute predictions $\hat{y}_X = f_X(X_{test})$
3. Compute margins for CV or OOB data $m_X = m(f_X, X_{OOB}, y_{train})$
4. initialize S=X
5. initialize $f_S = f_X$
6. initialize $m_S = m_X$
7. for d=1 to D do
8. initialize $p_S$=a vector of length |S| filled with zeros
9. for i=1 to |S| do
10. S'=S\$S_i$
11. Learn $f_{S'} = F(S'_{train}, y_{train})$
12. Compute margins for CV or OOB data $m_{S'} = m(f_{S'}, S'_{OOB}, y_{train})$
13. Compare $m_S$ and $m_{S'}$. Assign the p-value to the i-th element of $p_S$.
14. end for
15. Find $X_{d^*}$, the feature corresponding to the largest value in $p_S$
16. S*=S\$X_{d^*}$
17. Learn $f_{S^*} = F(S^*_{train}, y_{train})$
18. Compute predictions $\hat{y}_{S^*} = f_{S^*}(S^*_{test})$
19. Run the binomial test on $y_{test}, \hat{y}_X, \hat{y}_{S^*}$. Assign the p-value to p.
20. if p≤α/d then
21. break loop
22. end if
23. Compute margins for CV or OOB data $m_{S^*} = m(f_{S^*}, S^*_{OOB}, y_{train})$
24. S=S*
25. $f_S = f_{S^*}$
26. $m_S = m_{S^*}$
27. end for
28. Output: S At line 1, a system executing this code learns a full model based on training data $\{X_{train}, y_{train}\}$. At line 4, the system uses the full feature set as the first feature set and, at line 5, the system uses the full model as the first model. Lines 9 through 14 provide instructions for the system to generate potential second feature sets. More specifically, at line 10, the system removes a feature from the first feature set to generate a potential second feature set. At lines 11 and 12, the system generates a corresponding model and classification margin for the potential second feature set. The system then compares the classification margins of the potential second feature set and first feature set at line 13, to determine a selection p-value. The system iterates lines 9 through 14 to generate other potential second feature sets and determine the corresponding selection p-values.

At line 15, the system finds the feature associated with the largest selection p-value. At line 16, the system generates the second feature set by removing this found feature. Lines 17 through 19 instruct the system to evaluate the second feature set with the feature removed by determining an evaluation p-value. If, at line 20, the system determines that the evaluation p-value is less than or equal to a predetermined threshold, the system uses the first feature set as the reduced feature set, and outputs that feature set at line 28. On the other hand, if the system determines that the evaluation p-value is more than a predetermined threshold, the system uses the second feature set as the first feature set and iterates the process starting at line 7.

Figure 6:
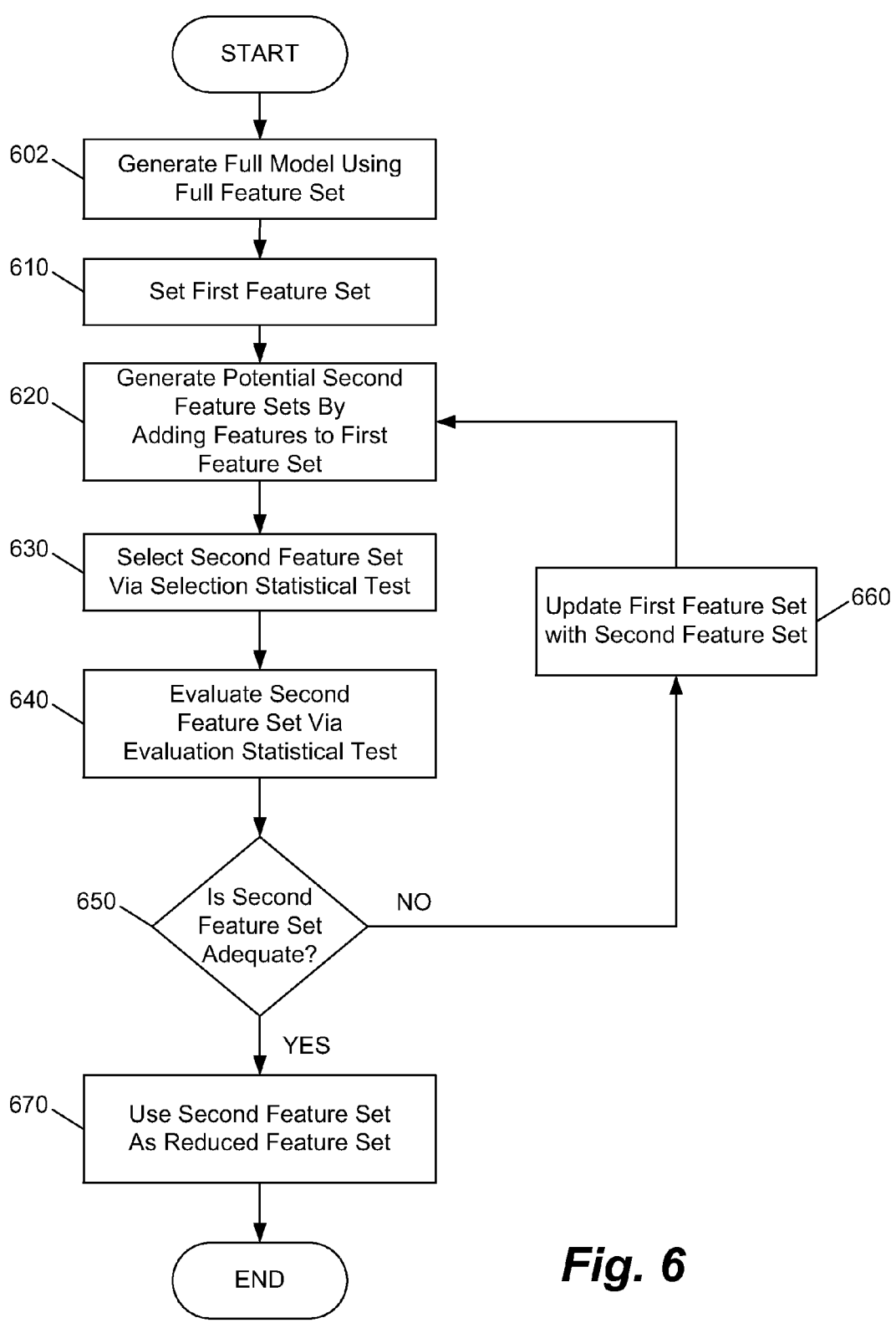
FIG. 6 is a flowchart of an exemplary method for performing forward sequential feature selection according to various embodiments.

FIG. 6 illustrates an exemplary method of determining a reduced feature set using forward addition. In various exemplary embodiments, the method of FIG. 6 may be performed by a system for determining a reduced feature set.

At Step 602, the system generates a full model using a full feature set. At Step 610, the system sets a null set as a first feature set. The null set may be a feature set with no features, i.e., an empty set. In some other embodiments, the first feature set may be some other subset of the full feature set, such as a subset having one or more features randomly selected from the full feature set. At Step 620, the system generates potential second feature sets. The system may generate potential second feature sets by adding one or more features from the full feature set to the first feature set. For example, the full feature set may comprise five features $\{s_1, s_2, s_3, s_4, s_5\}$. The system may generate five potential second feature sets by adding each of the five features to the null set, thus generating $\{s_1\}$, $\{s_2\}$, $\{s_3\}$, $\{s_4\}$, and $\{s_5\}$.

At Step 630, the system selects a second feature set from the plurality of potential second feature sets. The system may use a selection statistical test to make the selection. The system may use the selection statistical test to compare one of the potential second feature sets with the first feature set and obtain a comparison value indicative of the comparison. The system may compare the comparison values for the potential second feature sets to determine which potential second feature set to use as the second feature set. Step 630 is discussed in greater detail with reference to FIG. 7.

Figure 7:
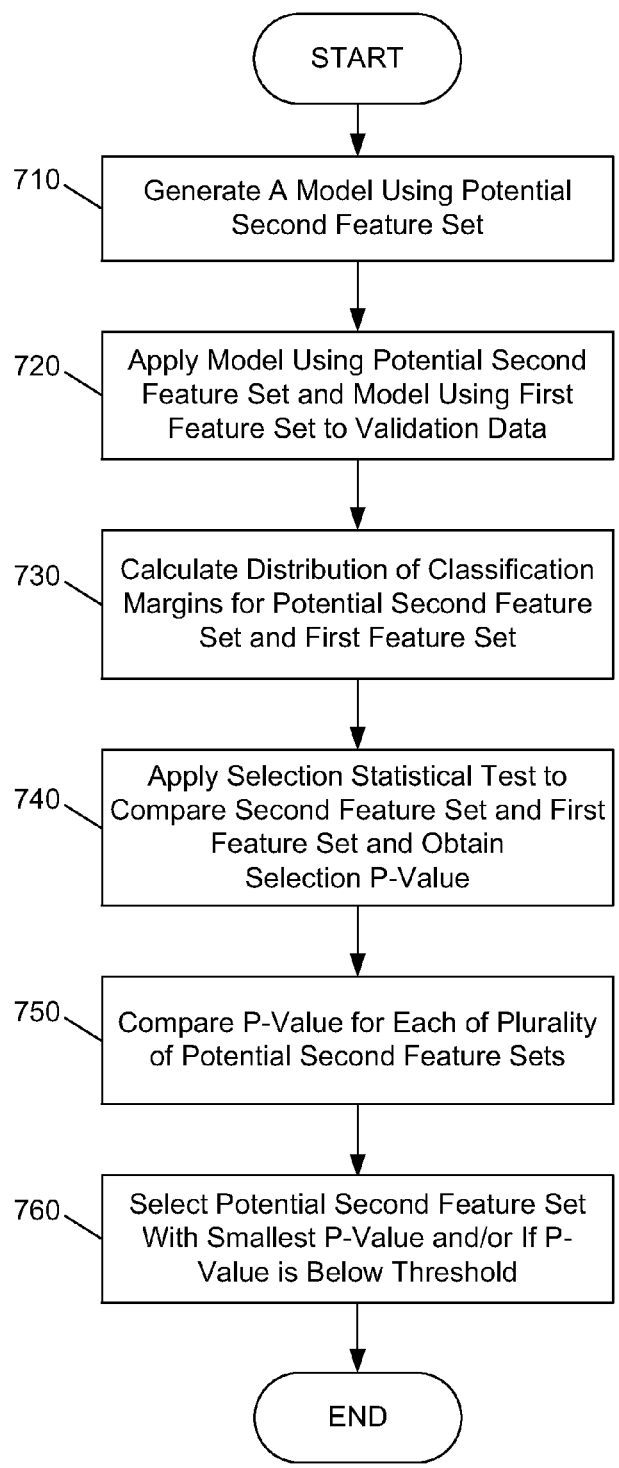
FIG. 7 is a flowchart of an exemplary method for selecting a feature set according to various embodiments.

FIG. 7 illustrates an exemplary method for selecting a second feature set according to some embodiments. At Step 710, the system generates a potential second model using one of the potential second feature sets. At Step 720, the system applies to a validation data set a first model using the first feature set (which at the beginning corresponds to the null feature set) and the potential second model. The first model and the potential second model may each generate estimates $\hat{y}_1 \ldots \hat{y}_p$. At the beginning, when the first feature set is the null set, a model built on the null set may give the same prediction for any test observation X. In some embodiments, for classification, such same prediction may be set to be the most common label present in the training set. The classification scores may be set to the fraction of the training set that is in each classification. For regression, the same predicted scalar response may be the mean over all response values y in the training set.

At Step 730, the system determines distributions of classification margins for the estimated labels generated by the first model, and for the estimated labels generated by the potential second model. At Step 740, the system compares the two distributions by using the selection statistical test. The selection statistical test may result in a selection p-value. The system may iterate Steps 710 to 740 for the other potential second feature sets. At Step 750, the system compares the selection p-values obtained for the plurality of potential second feature sets. At Step 760, the system may select the potential second feature set with the smallest selection p-value as the second feature set. The smallest selection p-value may indicate that the potential second feature set includes a most important feature which most significantly changes the performance of the potential second model, as compared with the first model. If the first feature set is a null feature set, such a feature set may be the optimal feature set for data sets composed of only irrelevant features. However, if the data set includes at least one relevant feature, adding a feature to the null feature set will not worsen the performance of the first feature set, may improve the performance over the first feature set. Therefore, in forward addition embodiments, the system may search for the potential second feature set that differs from the first feature set as much as possible. In some embodiments, such a selection corresponds to a smallest selection p-value. In some other embodiments, the system may select the potential second feature set with a selection p-value that is below a threshold. In various embodiments, the threshold may be a predetermined threshold. In some embodiments, the system may select a potential second feature set as the second feature set if its corresponding selection p-value is below the predetermined threshold without determining the selection p-value for the remaining potential second feature sets. In other embodiments, the threshold may be a function of the selection p-values of the other potential second feature sets. Such a threshold, for example, may be the smallest p-value corresponding to the other potential second feature sets. In such a case, the selected potential second feature set will have the smallest selection p-value among all potential feature sets.

Returning to FIG. 6, the system evaluates the selected second feature set at Step 640. In some embodiments, Step 640 may be performed according to flowchart 500 in FIG. 5, as described above. If the system determines that the second feature set is inadequate (Step 650: NO), the system may continue by adding more features to the second feature set. At Step 660, the system may update the first feature set with the second feature set and iterate Steps 620 to 650 with the updated first feature set. In such a manner, the system may add more features to the second feature set. For example, at the end of one iteration, the second feature set may comprise $\{s_5\}$, which is then set as the first feature set of the next iteration. At Step 620 of the next iteration, the system may generate four potential second feature sets comprising: $\{s_1, s_5\}$, $\{s_2, s_5\}$, $\{s_3, s_5\}$, and $\{s_4, s_5\}$. At Step 630, the system may select one of the potential second feature sets as a second feature set of the current iteration. At Step 640, the system may evaluate the second feature set.

If at Step 650 the system determines that the second feature set is adequate (Step 650: YES), the system may set the second feature set of the current iteration as the reduced feature set at Step 670. In various embodiments, the reduced feature set may have fewer features than the full feature set, while a model that uses the reduced feature set may perform within an acceptable range of accuracy as compared with a model that uses the full feature set.

The code below illustrates an exemplary implementation of the method of FIG. 6 according to one embodiment.
Input: Learnable model F
Input: Training data $\{X_{train}, y_{train}\}$ in space (X, Y) with dimensionality $D=|X|$
Input: Test data $\{X_{test}, y_{test}\}$ in the same space as $\{X_{train}, y_{train}\}$
Input: Test level for comparing with the full model $\alpha$ 1. Learn $f_X = F(X_{train}, y_{train})$
2. Compute predictions $\hat{y}_X = f_X(X_{test})$
3. Compute margins for CV or OOB data $m_X = m(f_X, X_{OOB}, y_{train})$
4. initialize $S = \emptyset$
5. initialize $f_S = f_\emptyset$
6. initialize $m_S = m_\emptyset$
7. for d=1 to D do
8. $\bar{S} = X \backslash S$
9. initialize $p_{\bar{S}} =$ a vector of length $|\bar{S}|$ filled with zeros
10. for i=1 to $|\bar{S}|$ do
11. $S' = S \cup \bar{S}_i$
12. Learn $f_{S'} = F(S'_{train}, y_{train})$
13. Compute margins for CV or OOB data $m_{S'} = m(f_{S'}, S'_{OOB}, y_{train})$
14. Compare $m_S$ and $m_{S'}$. Assign the p-value to the i-th element of $p_{\bar{S}}$.
15. end for
16. Find $\bar{S}_{d*}$, the feature corresponding to the smallest value in $p_{\bar{S}}$
17. $S^* = S \cup \bar{S}_{d*}$
18. Learn $f_{S^*} = F(S^*_{train}, y_{train})$
19. Compute predictions $\hat{y}_{S^*} = f_{S^*}(S^*_{test})$
20. Run the binomial test on $y_{test}, \hat{y}_X, \hat{y}_{S^*}$. Assign p-value to p.
21. if $p > \alpha/(D-d+1)$ then
22. break loop
23. end if
24. Compute margins for CV or OOB data $m_{S^*} = m(f_{S^*}, S^*_{OOB}, y_{train})$
25. $S = S^*$
26. $f_S = f_{S^*}$
27. $m_S = m_{S^*}$
28. end for
29. Output: S At line 1, a system executing this code learns a full model based on training data $\{X_{train}, y_{train}\}$. At line 4, the system uses a null feature set as the first feature set, and at line 5 the system uses a null model using the null feature set as the first model. Lines 8 through 14 provide instructions for the system to generate potential second feature sets. More specifically, at line 11, the system adds a feature from the full feature set to generate a potential second feature set. At lines 12 and 13, the system generates a corresponding model and classification margin for the potential second feature set. At line 13, the system compares the classification margins of the potential second feature set and first feature set, to determine a selection p-value. The system iterates lines 8 through 14 to generate other potential second feature sets and determine the corresponding selection p-values.

At line 16, the system finds the feature corresponding with the smallest selection p-value. At line 17, the system generates the second feature set by adding this found feature. Lines 18 through 20 instruct the system to evaluate the second feature set by determining an evaluation p-value. If, at line 21, the system determines that the evaluation p-value is more than a predetermined threshold, the system uses the second feature set as the reduced feature set, and outputs that feature set at line 29. On the other hand, if the system determines that the evaluation p-value is less than a predetermined threshold, the system uses the second feature set as the first feature set and iterates the process starting at line 8. In some embodiments, the system may iterate until no features are left in the feature set because the condition on line 21 is never satisfied. In such a case, the system may output the null set at line 29. Obtaining the null set as the optimal set may indicate that the data includes only features that are irrelevant to the desired classification.

Figure 9:
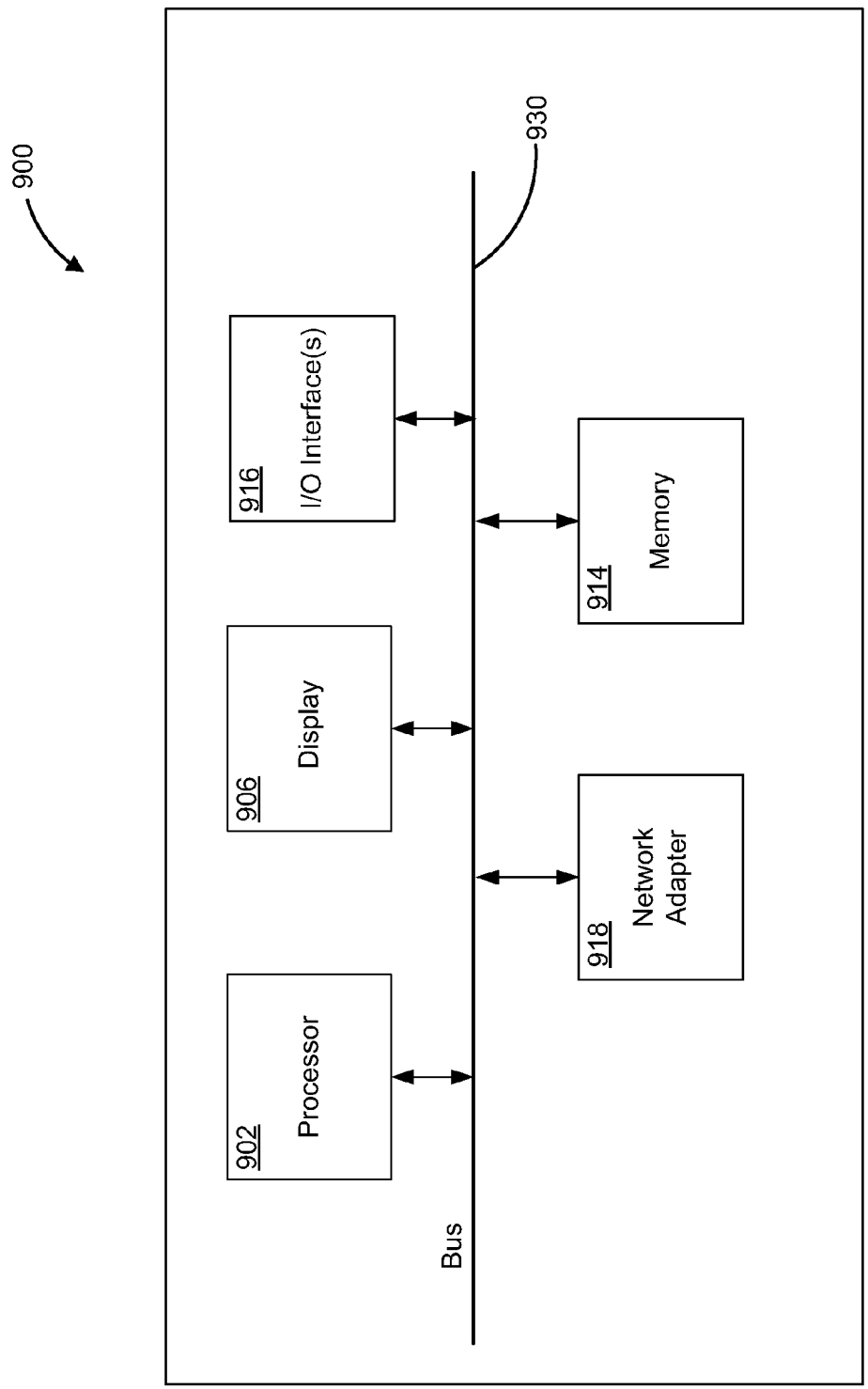
FIG. 9 is a block diagram of an exemplary computing device according to some embodiments.

In various embodiments, the disclosed systems or modules are implemented via one or more computing devices. FIG. 9 illustrates a block diagram of an exemplary computing system 900 according to some embodiments. According to some embodiments, system 900 includes a processor 902, memory 914, display 906, I/O interface(s) 916, and network adapter 918. These units may communicate with each other via bus 930, or wirelessly. The components shown in FIG. 9 may reside in a single device or multiple devices.

In various embodiments, processor 902 may be a microprocessor or a central processor unit (CPU) performing various methods in accordance to the embodiment. Memory 914 may include a computer hard disk, a random access memory (RAM), a removable storage, or a remote computer storage. In various embodiments, memory 914 stores various software programs executed by processor 902. Network adapter 918 enables device 900 to exchange information with external networks. In various embodiments, network adapter 918 includes a wireless wide area network (WWAN) adapter, or a local area network (LAN) adapter. I/O interfaces 916 may include keyboard, a mouse, an audio input device, a touch screen, or an infrared input interface.

In various embodiments, one or more of the disclosed modules are implemented via one or more processors executing software programs for performing the functionality of the corresponding modules. In some embodiments, one or more of the disclosed modules are implemented via one or more hardware modules executing, for example, firmware for performing the functionality of the corresponding modules. In various embodiments, one or more of the disclosed modules or disclosed storage mediums are internal or external to the disclosed systems. In some embodiments, one or more of the disclosed modules or storage media are implemented via a computing "cloud", to which the disclosed system connects via an internet and accordingly uses the external module or storage medium. In some embodiments, the disclosed storage media for storing information include non-transitory computer-readable media, such as a CD-ROM, a computer storage, and/or a flash memory. Further, in various embodiments, one or more non-transitory computer-readable media store information and/or software programs executed by various modules for implementing various disclosed methods.

In various embodiments, an I/O module is configured to receive inputs and to provide outputs. In some embodiments, the I/O module is an interface for receiving and sending data to a user or to another system. In various embodiments, the I/O module includes an input interface and an output interface. The input interface is configured to receive data, such as commands, and the output interface is configured to output information such as p-value or comparison results. In some embodiments, the I/O module includes one or more of an internet interface, a wireless interface, a data reader, a mouse, a keyboard, a display, a speaker, a touch screen, or a printer.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the invention is not limited to the above-described embodiments, but instead is defined by the appended claims in light of their full scope of equivalents.

The invention claimed is:

1. A method for determining, by one or more processors, a reduced feature set for a model for classifying data, the method comprising:
   obtaining a first feature set for the model;
   selecting a second feature set for the model, wherein the second feature set is a subset of the first feature set and is a candidate for the reduced feature set, the selecting comprising applying a selection statistical test by the one or more processors; and
   determining whether the model using the second feature set in place of the first feature set is adequate for classifying the data, the determining comprising applying an evaluation statistical test by the one or more processors.

2. The method of claim 1, further comprising executing an iteration, wherein the iteration comprises:
   setting a previous second feature set from a previous iteration as a current first feature set for a current iteration;
   selecting a current second feature set in the current iteration, wherein the current second feature set is a subset of the current first feature set; and
   determining whether the model using the current second feature set in place of the current first feature set is adequate for classifying the data.

3. The method of claim 2 further comprising:
   stopping the iteration if an outcome of the evaluation statistical test determines that using the current second feature set in place of the current first feature set is inadequate for classifying the data; and
   using the current first feature set as the reduced feature set for the model.

4. The method of claim 1, wherein selecting the second feature set further includes removing one feature from the first feature set.

5. The method of claim 1, wherein selecting the second feature set further comprises:
   obtaining a potential second feature set, the potential second feature set being a subset of the first feature set;
   applying the selection statistical test, wherein applying the selection statistical test comprises:
   comparing the model using the potential second feature set and the model using the first feature set, and
   deriving, based on the comparison, a selection p-value for the potential second feature set; and
   selecting the potential second feature set as the second feature set when the selection p-value for the potential second feature set exceeds a selection threshold or when the selection p-value for the potential second feature set is a largest selection p-value of a plurality of potential second feature sets.

6. The method of claim 5, wherein the potential second feature set is selected as the second feature set from among the plurality of potential second feature sets when the selection p-value for the potential second feature set is a largest selection p-value of the plurality of potential second feature sets.

7. The method of claim 5, wherein deriving the selection p-value for the potential second feature set includes comparing a distribution of classification margins for the model using the potential second feature set and a distribution of classification margins for the model using the first feature set.

8. A method for determining, by one or more processors, a reduced feature set for a model for classifying data, the method comprising:
obtaining a first feature set for the model;
selecting a second feature set for the model, wherein the second feature set is a subset of the first feature set and is a candidate for the reduced feature set; and
determining whether the model using the second feature set in place of the first feature set is adequate for classifying the data, the determining comprising applying, by the one or more processors, an evaluation statistical test by comparing the model using the second feature set and the model using the full feature set, and deriving, based on the comparison, an evaluation p-value for the second feature set, and determining that the model using the second feature set in place of the first feature set is adequate for classifying the data if the evaluation p-value exceeds an evaluation threshold.

9. The method of claim 8, further comprising executing an iteration, wherein the iteration comprises:
setting a previous second feature set from a previous iteration as a current first feature set for a current iteration;
selecting a current second feature set in the current iteration, wherein the current second feature set is a subset of the current first feature set;
determining whether the model using the current second feature set in place of the current first feature set is adequate for classifying the data.

10. The method of claim 9, further comprising:
stopping the iteration if an outcome of the evaluation statistical test determines that using the current second feature set in place of the current first feature set is inadequate for classifying the data; and
using the current first feature set as the reduced feature set for the model.

11. The method of claim 8, wherein:
deriving the evaluation p-value for the second feature set includes comparing a distribution of classification error for the model using the second feature set and a distribution of classification error for the model using the first feature set.

12. A method for determining, by one or more processors, a reduced feature set for a model for classifying data, the method comprising:
obtaining a first feature set for the model;
selecting a second feature set for the model, wherein the second feature set is a superset of the first feature set and is a candidate for the reduced feature set, the selecting comprising applying a selection statistical test by the one or more processors; and
determining whether the model using the second feature set in place of the first feature set is adequate for classifying the data, the determining comprising applying an evaluation statistical test by the one or more processors.

13. The method of claim 12, further comprising executing an iteration, wherein the iteration comprises:
setting a previous second feature set from a previous iteration as a current first feature set for a current iteration;
selecting a current second feature set in the current iteration, wherein the current second feature set is a superset of the current first feature set; and
determining whether the model using the current second feature set in place of the current first feature set is adequate for classifying the data.

14. The method of claim 13 further comprising:
stopping the iteration if an outcome of the evaluation statistical test determines that using the current second feature set in place of the current first feature set is adequate for classifying the data; and
using the current second feature set as the reduced feature set for the model.

15. The method of claim 12, wherein selecting the second feature set further includes adding a new feature to the first feature set, wherein the new feature is selected from a full feature set for the model.

16. The method of claim 12, wherein selecting the second feature set further comprises:
obtaining a potential second feature set, the potential second feature set being a superset of the first feature set;
applying the selection statistical test, wherein applying the selection statistical test comprises:
comparing the model using the potential second feature set and the model using the first feature set, and
deriving, based on the comparison, a selection p-value for the potential second feature set; and
selecting the potential second feature set as the second feature set when the selection p-value for the potential second feature set is below a selection threshold or when the selection p-value for the potential second feature set is a smallest selection p-value of a plurality of potential second feature sets.

17. The method of claim 16, wherein the potential second feature set is selected as the second feature set from among the plurality of potential second feature sets when the selection p-value for the potential second feature set is a smallest selection p-value of the plurality of potential second feature sets.

18. The method of claim 16, wherein deriving the selection p-value for the potential second feature set includes comparing a distribution of classification margins for the model using the potential second feature set and a distribution of classification margins for the model using the first feature set.

19. A method for determining, by one or more processors, a reduced feature set for a model for classifying data, the method comprising:
obtaining a first feature set for the model;
selecting a second feature set for the model, wherein the second feature set is a superset of the first feature set and is a candidate for the reduced feature set; and
determining whether the model using the second feature set in place of the first feature set is adequate for classifying the data, the determining comprising applying, by the one or more processors, an evaluation statistical test by comparing the model using the second feature set and the model using the full feature set, and deriving, based on the comparison, an evaluation p-value for the second feature set, and determining that the model using the second feature set in place of the first feature set is adequate for classifying the data if the evaluation p-value exceeds an evaluation threshold.

20. The method of claim 19, further comprising executing an iteration, wherein the iteration comprises:
setting a previous second feature set from a previous iteration as a current first feature set for a current iteration;
selecting a current second feature set in the current iteration, wherein the current second feature set is a superset of the current first feature set; and
determining whether the model using the current second feature set in place of the current first feature set is adequate for classifying the data.

21. The method of claim 20, further comprising:
stopping the iteration if an outcome of the evaluation statistical test determines that using the current second feature set in place of the current first feature set is adequate for classifying the data; and
using the current second feature set as the reduced feature set for the model.

22. The method of claim 19, wherein:
deriving the evaluation p-value for the second feature set includes comparing a distribution of classification error for the model using the second feature set and a distribution of classification error for the model using the first feature set.

23. A system for determining a reduced feature set for a model for classifying data, the system comprising:
a storage device configured to store a first feature set;
a selector module configured to select a second feature set for the model, wherein the second feature set is a subset of the first feature set and is a candidate for the reduced feature set; and
an evaluator module configured to determine whether the model using the second feature set in place of the first feature set is adequate for classifying the data,
wherein selecting the second feature set includes applying a selection statistical test by one or more processors and wherein determining whether the model using the second feature set is adequate for classifying the data includes applying an evaluation statistical test by the one or more processors.

24. A system for determining a reduced feature set for a model for classifying data, the system comprising:
a storage device for storing a first feature set;
a selector module configured to select a second feature set for the model, wherein the second feature set is a superset of the first feature set and is a candidate for the reduced feature set; and
an evaluator module configured to determine whether the model using the second feature set in place of the first feature set is adequate for classifying the data,
wherein selecting the second feature set includes applying a selection statistical test by one or more processors and wherein determining whether the model using the second feature set is adequate for classifying the data includes applying an evaluation statistical test by the one or more processors.

25. A non-transitory computer-readable medium for storing a program, wherein the program, when executed by one or more processors, causes the one or more processors to determine a reduced feature set for a model for classifying data, the program comprising one or more instructions that, when executed by the one or more processors, cause the one or more processors to:
obtain a first feature set for the model;
select a second feature set for the model, wherein the second feature set is a subset of the first feature set and is a candidate for the reduced feature set, the selecting comprising applying a selection statistical test by the one or more processors; and
determine whether the model using the second feature set in place of the first feature set is adequate for classifying the data, the determining comprising applying an evaluation statistical test by the one or more processors.

26. A non-transitory computer-readable medium for storing a program, wherein the program, when executed by one or more processors, causes the one or more processors to determine a reduced feature set for a model for classifying data, the program comprising one or more instructions that, when executed by the one or more processors, cause the one or more processors to:
obtain a first feature set for the model;
select a second feature set for the model, wherein the second feature set is a subset of the first feature set and is a candidate for the reduced feature set; and
determine whether the model using the second feature set in place of the first feature set is adequate for classifying the data, the determining comprising applying, by the one or more processors, an evaluation statistical test by comparing the model using the second feature set and the model using the full feature set, and deriving, based on the comparison, an evaluation p-value for the second feature set, and determining that the model using the second feature set in place of the first feature set is adequate for classifying the data if the evaluation p-value exceeds an evaluation threshold.

27. A non-transitory computer-readable medium for storing a program, wherein the program, when executed by one or more processors, causes the one or more processors to determine a reduced feature set for a model for classifying data, the program comprising one or more instructions that, when executed by the one or more processors, cause the one or more processors to:
obtain a first feature set for the model;
select a second feature set for the model, wherein the second feature set is a superset of the first feature set and is a candidate for the reduced feature set, the selecting comprising applying a selection statistical test by the one or more processors; and
determine whether the model using the second feature set in place of the first feature set is adequate for classifying the data, the determining comprising applying an evaluation statistical test by the one or more processors.

28. A non-transitory computer-readable medium for storing a program, wherein the program, when executed by one or more processors, causes the one or more processors to determine a reduced feature set for a model for classifying data, the program comprising one or more instructions that, when executed by the one or more processors, cause the one or more processors to:
obtain a first feature set for the model;
select a second feature set for the model, wherein the second feature set is a superset of the first feature set and is a candidate for the reduced feature set; and
determine whether the model using the second feature set in place of the first feature set is sufficient for classifying the data, the determining comprising applying, by the one or more processors, an evaluation statistical test by comparing the model using the second feature set and the model using the full feature set, and deriving, based on the comparison, an evaluation p-value for the second feature set, and determining that the model using the second feature set in place of the first feature set is adequate for classifying the data if the evaluation p-value exceeds an evaluation threshold.

* * * * *